(12) United States Patent
Lieret et al.

(10) Patent No.: US 10,683,897 B2
(45) Date of Patent: Jun. 16, 2020

(54) OVERLOAD CLUTCH

(71) Applicant: OECHSLER Aktiengesellschaft, Ansbach (DE)

(72) Inventors: Roland Lieret, Weihenzell (DE); Martin Wolf, Ansbach (DE)

(73) Assignee: OECHSLER AKTIENGESELLSCHAFT, Ansbach (DE)

(*) Notice: Subject to any disclaimer, the term of this patent is extended or adjusted under 35 U.S.C. 154(b) by 315 days.

(21) Appl. No.: 15/730,966

(22) Filed: Oct. 12, 2017

(65) Prior Publication Data
US 2018/0106298 A1 Apr. 19, 2018

(30) Foreign Application Priority Data

Oct. 16, 2016 (DE) .................. 10 2016 012 293
May 13, 2017 (DE) .................. 10 2017 004 617

(51) Int. Cl.
| F16D 7/02 | (2006.01) |
| F16D 7/00 | (2006.01) |
| F16D 1/072 | (2006.01) |
| F16D 1/096 | (2006.01) |
| B29C 45/14 | (2006.01) |
| B29L 31/00 | (2006.01) |

(52) U.S. Cl.
CPC ............ *F16D 7/021* (2013.01); *F16D 1/072* (2013.01); *F16D 1/096* (2013.01); *F16D 7/002* (2013.01); *F16D 7/022* (2013.01); *F16D 7/024* (2013.01); *B29C 45/14819* (2013.01); *B29L 2031/7486* (2013.01); *Y10T 403/559* (2015.01)

(58) Field of Classification Search
CPC .......... F16D 7/021; F16D 7/024; F16D 7/002; F16D 7/022; F16D 1/096; F16D 43/211; B29L 2031/7486; B29C 45/14819; Y10T 403/559
USPC .......................... 464/31, 38, 41, 42; 403/298
See application file for complete search history.

(56) References Cited

U.S. PATENT DOCUMENTS

| 715,298 | A | * | 12/1902 | Roberts | ........................... 464/42 |
| 3,186,190 | A | | 6/1965 | Maillot | |
| 3,481,160 | A | * | 12/1969 | Georgi | ...................... F16D 7/02 464/42 |
| 4,287,975 | A | * | 9/1981 | Tuzson | ................... F16D 43/25 464/31 |

* cited by examiner

*Primary Examiner* — Greg Binda
(74) *Attorney, Agent, or Firm* — Buchanan Ingersoll & Rooney PC

(57) ABSTRACT

A clutch which reacts to torque overload has a ribbed disc which is produced by plastics injection moulding and which is, along its inner or outer periphery, encapsulated in encircling fashion and on both axial side surfaces by an encompassing ring. Said encompassing ring, owing to shrinkage as a result of cooling, enters into static friction engagement with the ribbed disc, and furthermore engages, by means of bevelled flanks, with ribs running radially on at least one of the side surfaces of the ribbed disc.

8 Claims, 5 Drawing Sheets

OVERLOAD CLUTCH

CROSS-REFERENCES TO RELATED APPLICATIONS

This application claims the benefit of German Application No. DE102017004617.4 filed May 13, 2017 and German Application No. DE102016012293.5 filed Oct. 16, 2016, the entire content of each of which is incorporated herein by reference.

TECHNICAL FIELD

The invention relates to an overload clutch.

BACKGROUND ART

A clutch of said type is known from U.S. Pat. No. 3,186,190 for the transmission of torque, in a manner protected against overloading, in a motor drivetrain. There, at the end of a shaft, the shell surface of a cylindrical metallic hub is encapsulated by a ring composed of plastic. The hub and ring are connected to one another exclusively by adhesive (static friction) action. This coupling turns to sliding friction if the rotational movement of the hub relative to the ring is braked to a critical degree. Owing to the selected material pairing, it is then the case that, under the influence of the heat of friction that arises, the plastics ring expands to a greater extent than the metal hub, as a result of which the rotational coupling is ultimately eliminated entirely as a result of lessening friction between the clutch partners; this is the case until the clutch pairing, in the absence of mutual contact between the clutch partners, has cooled again and the ring, which shrinks as a result of cooling, thus enters into adhesive (static friction) engagement with the hub again.

SUMMARY

In design practice, for example in equipment engineering, it is however desired for the clutch pairing to not possibly suddenly open in the event of an exceedance of a defined load threshold (also referred to below generally as overload) and thereafter re-engage in uncontrolled fashion.

Based on this consideration, the technical problem addressed by the present disclosure is that of specifying an overload clutch which is of small construction but which reacts in a reproducible manner and which is inexpensive to produce and which does not fully open even in an overload situation.

The two clutch partners are produced in a two-component plastics injection moulding process. One clutch partner, hereinafter referred to as ribbed disc, is a ring formed in the manner of a holed disc and with radially oriented ribs and with lateral flanks on at least one of its two axial side surfaces, which flanks are bevelled in a peaked, that is to say saddle-shaped or pent-roof-shaped, manner and are capped toward the apex. The ribbed disc, after its shrinkage to the steady-state dimensions, is encapsulated on three sides—across the face of the outer or inner periphery and on both side surfaces—by an encompassing ring, which is U-shaped in axial longitudinal section and which is composed of a plastic which is viscoplastic after cooling, as the other clutch partner. Said encompassing ring as the second of the clutch partners exhibits pronounced temperature-dependent shrinkage behaviour, and therefore, during the course of the cooling, presses the encompassing ring with yoke and limbs against the ribbed disc. Thus, the ribbed disc lies, with an encircling ring-shaped region within its outer circumference, in non-positively locking fashion against the interior of the U-shaped yoke. As a result of this casting-in action, the inner surface geometry of the encompassing ring is complementary with respect to the topography of the ribbed disc coaxial with respect thereto, and both are, within the ring-shaped region, rotationally conjointly in axially positively locking engagement with one another by means of the ribs which protrude axially from the side surfaces of the ribbed disc.

In the event of overload, a transition from the adhesive (static friction) engagement to sliding friction between the two clutch partners occurs in a ring-shaped region within the outer periphery of the ribbed disc, and thus the free end regions of the U limbs of the encompassing ring are spread open in positively locking fashion owing to the rib flanks on the ribbed disc peripherally running up axially against those in the encompassing ring. Upon engagement into the detent structure of the adjacent rib distribution, the clutch is and remains in adhesive (static friction) and positively locking engagement again if the overload situation that has previously occurred no longer prevails.

Thus, the elastic enclosure of the ribbed disc by the encompassing ring leads, as a result of a reversible transition between adhesive (static) friction and positive locking, to a defined, reproducible reaction of the clutch to overload. After the depletion of said overload, the torque that is introduced is again transmitted without losses.

The reaction of the clutch that is reproducible even over the long term by means of a load-defined transition out of adhesive (static) friction can be influenced in particular by means of the encompassing action of the U limbs, the rib geometry and the material pairing. The materials of the two clutch partners should exhibit no tendency for chemical bonding between the surfaces, which adjoin one another, of ribbed disc and encompassing ring. It is also important that the clutch partner that is injection-moulded first, in this case the ribbed disc, remains dimensionally stable and does not experience any melting of its surfaces when it, as an insert in the injection mould, is encapsulated with the material of the second clutch partner, in this case of the encompassing ring. As a material pairing, use may for example be made, for the ribbed disc, of particularly heat-resistant thermoplastics such as PPA or PPS, and of PA or PBT for the encapsulation thereof for the purposes of forming the encompassing ring. The materials expediently have fibre reinforcements in order to increase the mechanical characteristics of the injection-moulded parts and in order to reduce the shrinkage. In particular, it would otherwise be possible for overly intense shrinkage behaviour of the encompassing ring to lead to inadmissible stresses, to the point of material deformations, in the ribbed disc which is encompassed in ring-shaped encircling fashion by the encompassing ring.

The axial height of the ribs which run in radial fashion on both sides of the ribbed disc expediently decreases in the direction of the U yoke of the encompassing ring, because the two encompassing limbs are connected to one another by means of the U yoke, that is to say cannot move apart from one another. Along the ring-shaped U yoke, the ribs run into the planes of the axial side surfaces of the ribbed disc. In the ring region inside the outer edge of the ribbed disc, the clutch thus exhibits virtually no positive locking, but rather practically only adhesive (static friction) engagement, with the stiff elastic encompassing action of the encompassing ring shrunk onto the ribbed disc. If said adhesive (static friction) engagement exhibits the tendency to transition to sliding engagement in reaction to the introduced torque, the axial engagement of the ribs against the U limbs of the encompassing ring immediately begins to bear load. The rib heights which increase proceeding from the U yoke result in an increasing peripheral accommodation of load, with the U-limbs being spread apart. If a further increasing torque then causes the ribs to be lifted axially out of mutual engagement along their flanks, with the free U limbs of the encompassing ring being deflected axially away from one another, this results in spinning in the manner of a ratchet; this occurs until the torque falls again and, with the engagement of the flanks of the ribs into one another, the adhesive (static friction) engagement between ribbed disc and encompassing ring re-stabilizes.

This results in an increased combined clutch action, which arises from the adhesive (static) friction between the mutually abutting surfaces of the ribbed disc, which is encapsulated by the encompassing ring, and the radially increasing, rib-like positive locking between said surfaces. Owing to the structurally predefinable gradient and peripheral rounding of the rib flanks on the ribbed disc, the onset of the transition from pure sliding friction to the mixed adhesive (static friction) engagement and positive locking can be influenced; also, by means of asymmetrical flanks of the ribs on the two sides of the ribbed disc, the clutch force can be made dependent on the direction of rotation. By injection of a lubricant between the hub ring and encompassing ring, for example through a thin duct left free during the encapsulation process, the torque that can be transmitted by the clutch can be reduced in targeted fashion.

By means of an axial and radial widening, which can likewise be structurally predefined, of the ribs which thus run in each case in the manner of a T-shaped tongue into the surface of the ribbed disc, it is the case here that critical specific material loads along the periphery of the ribbed disc owing to the axial contact pressure imparted by the shrunk-on encompassing ring are avoided. In this way, a broader spectrum of plastics can be used for the ribbed disc. Furthermore, such a geometry opens up a further degree of freedom for the structural influencing of the reaction behaviour of the clutch.

The overload clutch can advantageously be standardized even for relatively low torques. It is furthermore suitable for transmitting high torques in a restricted structural space. For the transmission of even higher loads, said clutch can be easily cascaded axially along a central shaft.

Said clutch may be used, in particular where high-speed actuators of small construction are subjected to a geared rotational speed reduction for the purposes of increasing torque, in order to predefine a maximum drive torque or as an emergency interrupter of the drivetrain, or also for example for avoiding coming to a standstill against end stops, in particular in the case of worm gear stage actuators.

DETAILED DESCRIPTION

Figure 1:
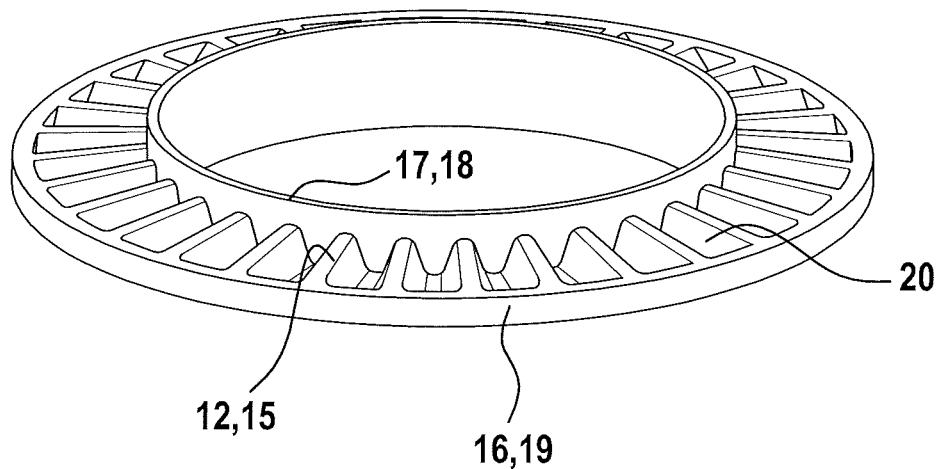
FIG. 1 shows, in an oblique view onto one of its axial side surfaces, the ribbed disc which is profiled with ribs which taper off in ramped or wedge-shaped fashion.
Figure 2:
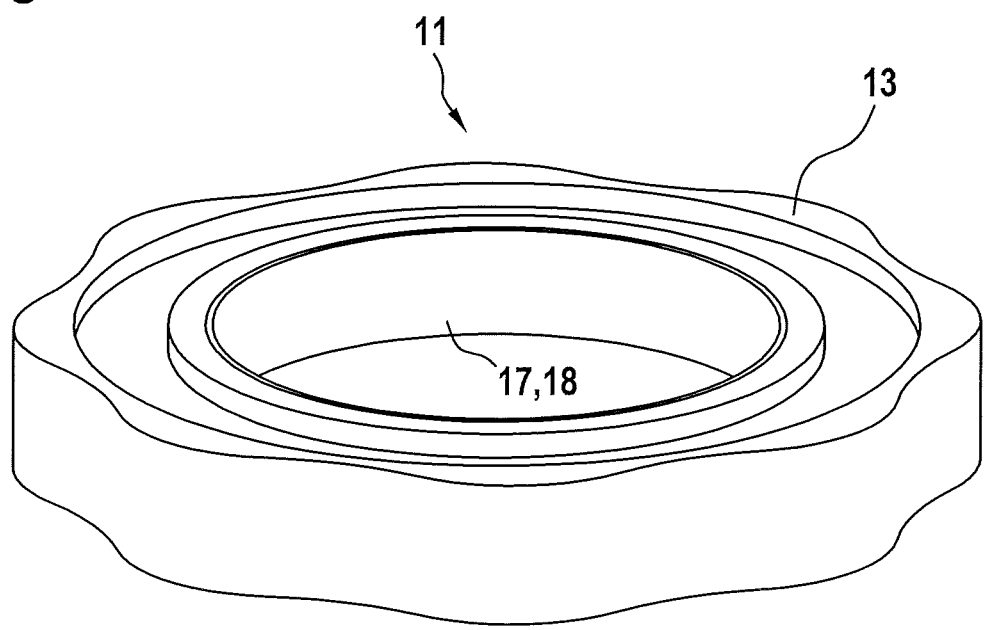
FIG. 2 shows the ribbed disc from FIG. 1 encapsulated with a viscoplastic encompassing ring to form the overload clutch.

Hereinafter, embodiments according to the present disclosure will be described with reference to the accompanying drawings.

The clutch 11, which reacts reversibly and reproducibly to a predefined torque or generally to torque overload, has a substantially planar ribbed disc 12 which is produced by plastics injection moulding and which has a central hole. Said ribbed disc is, as per FIG. 3, encompassed in U-shaped fashion in axial longitudinal section, likewise by plastics injection moulding, by an encompassing ring 13, specifically is surrounded by a plastic on both of its axial side surfaces 15 and on its face 16 which runs in encircling fashion along the outer periphery 19, which plastic, as a result of intense shrinkage phenomena during the cooling process, enters into adhesive (static friction) engagement with the ribbed disc 12. The ribbed disc 12 thus acts as a hub for this rotating assembly.

Onto the inner periphery 17 of the ribbed disc 12 there is integrally formed a concentrically encircling, hollow cylindrical collar 18 for the introduction of a torque. In the case of a dimensionally stable inner periphery 17 of the ribbed disc 12, the collar 18 may also be omitted. In practice, the inner periphery of the collar 18 or the inner periphery 17 of the ribbed disc has a non-circular border for the transmission of torques.

Toward the outer periphery 19 of the ribbed disc 12, spoke-like ribs 20 extend on at least one of the two side surfaces 15 of said ribbed disc. Said profiling is received in complementary fashion by the applied encapsulation of the encompassing ring 13. As a result, in addition to the adhesive (static) friction between the materials of ribbed disc 12 and encompassing ring 13 within the outer periphery 19, positive locking is generated between the two clutch partners in the form of the ribbed disc 12 and the encompassing ring 13. In axial section, the form of a web (in the form of the ribbed disc 12) running in encircling fashion on a flange (in the form of the collar 18 along the inner periphery 17) is realized for example as per FIG. 3.

Owing to the peripheral number and owing to the radial profile of the axial heights of the ribs 20 and owing to the inclination of the flanks 21 thereof on at least one of the axial disc side surfaces 15, the load-dependent transition from clutch adhesive (static friction) engagement to clutch positive locking can be structurally influenced. If the peripheral rib flanks 21 have a different inclination in one rotational direction of the clutch 11 than in the opposite direction, the reaction of the overload clutch 11 is made dependent on rotational direction in a targeted manner.

Figure 3:
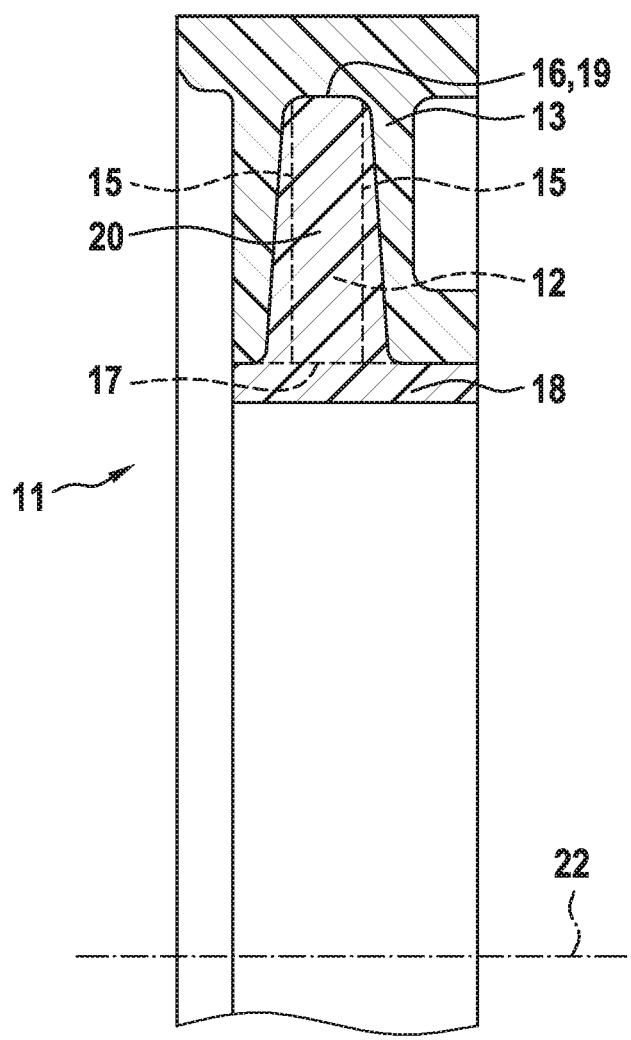
FIG. 3 shows the ribbed disc encapsulated by the encompassing ring to form a hub, as per FIG. 2, in an enlarged axial longitudinal section.
Figure 4:
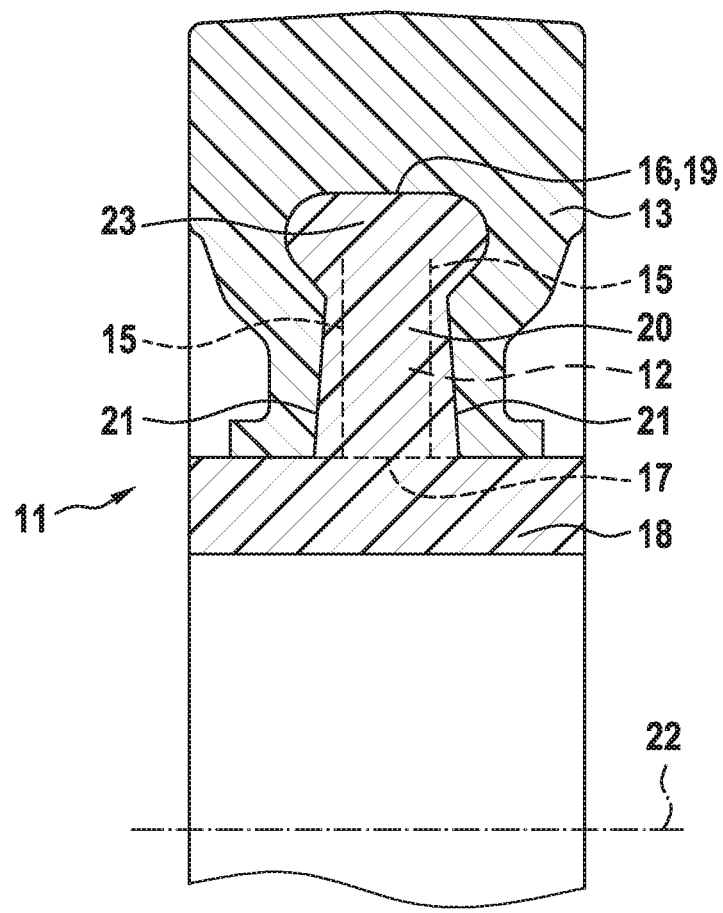
FIG. 4 shows a ribbed profile, modified in relation to FIG. 3, on the hub.

The intense axial shrinkage of the encompassing ring 13 onto the two side surfaces 15 and thus also onto the ribs 20 of the ribbed disc 12, which in FIG. 3 acts as hub, can press the material of said ribbed disc, in the region of the shallow tapering-off of the rib height into the respective side surface 15, to the limit of the load capacity, such that then, owing to softening, the stability required for adhesive (static) friction is lost. The specific pressure load is however reduced to functionally non-critical conditions if, as per the cross-sectional illustration of FIG. 4, the the ribs 20, toward the outer periphery 19 of the ribbed disc 12, are widened in the peripheral direction. In the axial longitudinal section, this results in the profile of a solid rail which runs in encircling fashion around the axis of rotation 22 of ribbed disc 12 and encompassing ring 13; said rail has its web (rib 20) between foot (collar 18) and a rail head in the form of the T-shaped widening 23 to the edge region, which runs in encircling fashion inside the outer periphery 19, of the ribbed disc 12.

Figure 5:
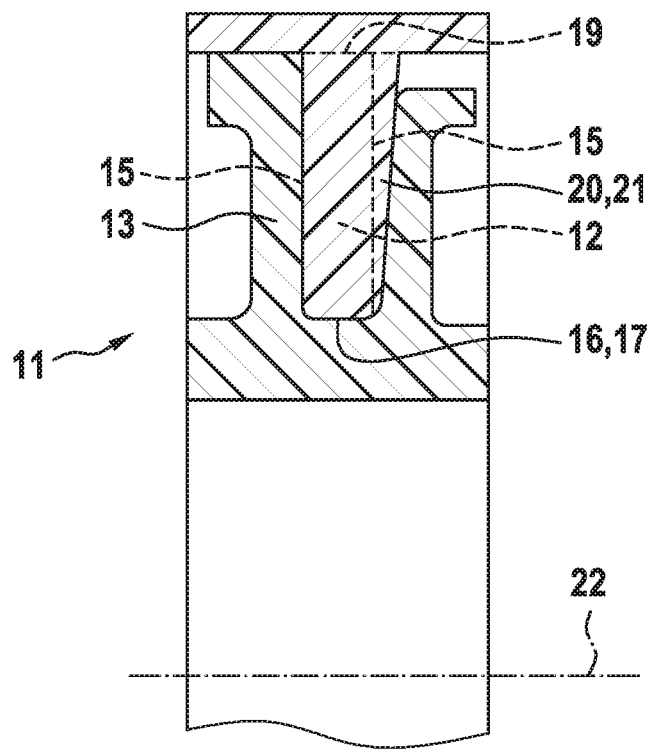
FIG. 5 shows an embodiment radially inverted in relation to FIG. 3, that is to say with the encompassing ring now as a hub.

In the variant as per FIG. 5, which is radially inverted in relation to FIG. 3, it is now the case that the encompassing ring 13 is provided as a hub, which is extended through by the axis of rotation 22, of the ribbed disc 12. For this purpose, the inner periphery 17 thereof engages into the encircling, centripetally open U-shaped profile of the encompassing ring 13.

Figure 6:
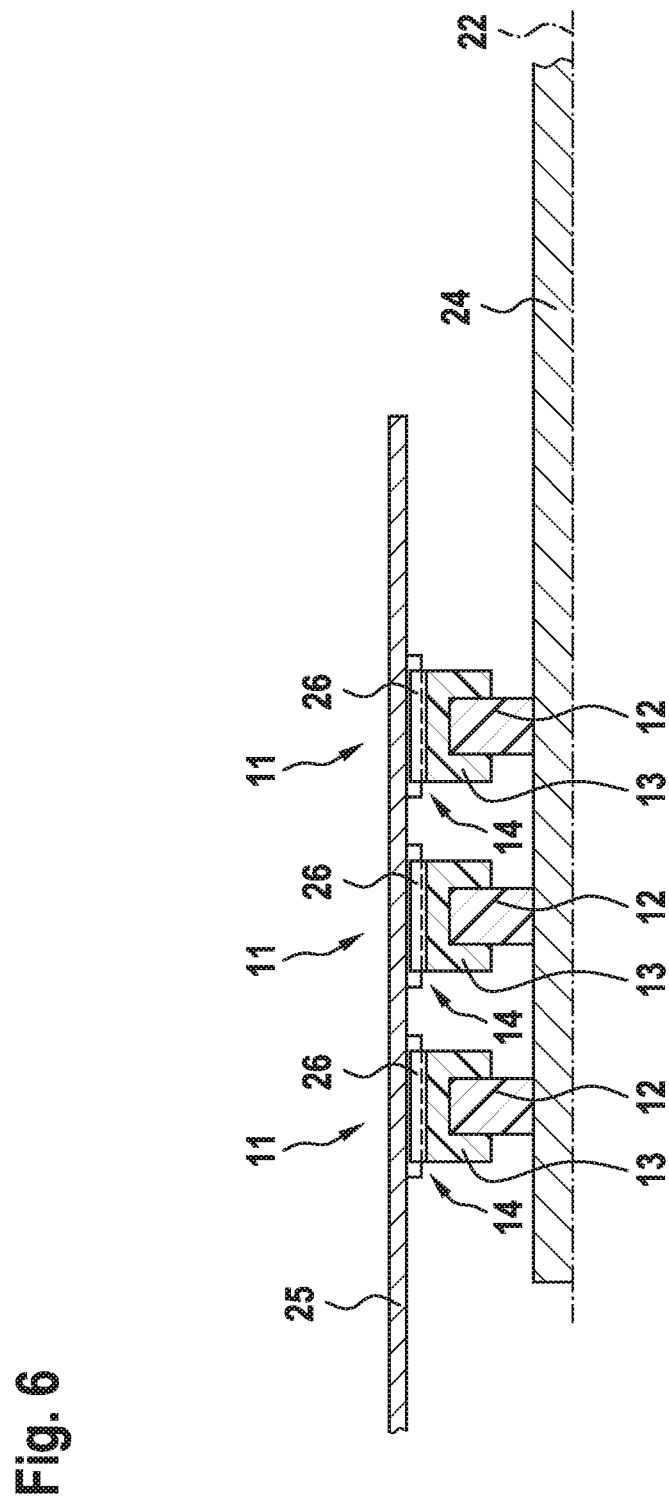
FIG. 6 shows a cascading of multiple overload clutches as per, for example, FIG. 3.

For the transmission of relatively high torques in a manner protected against overloading, it is expediently the case that multiple clutches 11 of the type described above are cascaded in parallel. Contrary to the diagrammatic illustration of FIG. 6, the individual clutches may be positioned axially directly adjacent to one another if, for example, the axial width of the U yoke on the ribbed disc 12 provides the elastic limbs thereof sufficient axial spreading space at the free face ends thereof which engage between the relatively large rib heights. In the exemplary embodiment depicted in FIG. 6, three clutches 11 are mounted with their ribbed discs 12 rotationally conjointly on a hub shaft 24. A surrounding hollow shaft 25 is equipped with three correspondingly positioned internal gears 26, which mesh with spur toothings 14 of the encompassing rings 13; alternatively, one spur gearwheel of corresponding axial width (not illustrated) meshes therewith. In any case, it is thus the case that each of the three clutches 11 has to be designed only for one third of the torque that is to be transmitted in the selective direction.

Thus, a clutch 11 which reacts to torque overload has a ribbed disc 12 which is produced by plastics injection moulding as one clutch partner, which ribbed disc is, along its outer periphery 19—or, in the case of a central hole, along its inner periphery 17 —, encapsulated in encircling fashion and on both axial side surfaces 15 by an encompassing ring 13 as the other clutch partner. Said encompassing ring, owing to shrinkage as a result of cooling, enters into adhesive (static friction) engagement with the ribbed disc 12, and furthermore engages, by means of bevelled flanks 21, with ribs 20 running radially in the manner of spokes on at least one of the side surfaces 15 of the ribbed disc 12. The axial heights of the ribs 20 preferably taper off from a collar 18 along an inner periphery 17 of the ribbed disc 12 in the direction of the outer periphery 19 of said ribbed disc into the respective plane of the side surfaces 15 of said ribbed disc, with axial widening 23. For rotational-direction-dependent opening of the clutch 11, the flanks 21 on both sides of the ribs 20 have different gradients. In the case of such clutches 11 being cascaded coaxially, the torque to be transmitted is distributed across said clutches.

LIST OF REFERENCE DESIGNATIONS

11 Clutch
12 Ribbed disc (of 11)
13 Encompassing ring (on 15-16-15 of 12)
14 Spur toothing (of 13)
15 Side surfaces (of 12)
16 Face (of 12)
17 Inner periphery (of 12)
18 Collar (along 17)
19 Outer periphery (of 12)
20 Ribs (on 15)
21 Flanks (of 20)
22 Axis of rotation (of 12, 13, 24)
23 T-shaped widening (of 20 toward 19)
24 Shaft (in 12)
25 Hollow shaft (around 13)
26 Internal gear (in 25, in engagement with 14)

The invention claimed is:

1. Clutch which reacts to torque overload, comprising:
a ribbed disc which is produced by plastics injection moulding; and
a plastic ring which encapsulates the ribbed disc in encircling fashion along an inner or outer periphery of the ribbed disc and on both axial side surfaces of the ribbed disc, wherein
the plastic ring is in static friction engagement with said ribbed disc along the inner or outer periphery of the ribbed disc and furthermore engages, by means of bevelled flanks, with spoke-like ribs running radially on at least one of the side surfaces of the ribbed disc configured to effect a positive locking in a circumferential direction between the ribbed disc and the plastic ring.

2. Clutch according to claim 1, further comprising a collar which runs in coaxially encircling fashion along the inner periphery of the ribbed disc.

3. Clutch according to claim 1, wherein the heights of the ribs taper off in the direction of the outer periphery of the ribbed disc.

4. Clutch according to claim 1, wherein the ribs end with a T-shaped peripheral widening.

5. Clutch according to claim 1, wherein ribs are provided on both side surfaces of the ribbed disc.

6. Clutch assembly comprising multiple clutches according to claim 1 cascaded coaxially.

7. Clutch assembly according to claim 6, wherein said multiple clutches, offset coaxially relative to one another, are arranged rotationally conjointly on a central shaft and are surrounded by a hollow shaft or adjacent to a spur gearwheel, which spur gearwheels mesh with spur toothings of the plastic rings.

8. Clutch according to claim 1, wherein either the ribbed disc as a hub is surrounded by the plastic ring, or else the plastic ring as a hub is surrounded by the ribbed disc.

* * * * *